United States Patent
Ge et al.

(10) Patent No.: US 11,255,792 B2
(45) Date of Patent: Feb. 22, 2022

(54) SERS SENSOR

(71) Applicant: Hewlett-Packard Development Company, L.P., Houston, TX (US)

(72) Inventors: Ning Ge, Palo Alto, CA (US); Anita Rogacs, San Diego, CA (US); Steven J. Simske, Fort Collins, CO (US); Milo Overbay, Corvallis, OR (US); Viktor Shkolnikov, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 215 days.

(21) Appl. No.: 16/098,058

(22) PCT Filed: Jul. 21, 2016

(86) PCT No.: PCT/US2016/043437
§ 371 (c)(1),
(2) Date: Oct. 31, 2018

(87) PCT Pub. No.: WO2018/017107
PCT Pub. Date: Jan. 25, 2018

(65) Prior Publication Data
US 2019/0170650 A1 Jun. 6, 2019

(51) Int. Cl.
*G01N 21/65* (2006.01)
*B82Y 15/00* (2011.01)
*B82Y 30/00* (2011.01)
*G01J 3/44* (2006.01)

(52) U.S. Cl.
CPC .......... *G01N 21/658* (2013.01); *B82Y 15/00* (2013.01); *B82Y 30/00* (2013.01); *G01J 3/44* (2013.01); *G01N 21/65* (2013.01)

(58) Field of Classification Search
None
See application file for complete search history.

(56) References Cited

U.S. PATENT DOCUMENTS

| | | | |
|---|---|---|---|
| 8,958,070 B2 | 2/2015 | Wang | |
| 2002/0068018 A1 | 6/2002 | Pepper et al. | |
| 2006/0054881 A1* | 3/2006 | Li | G01N 21/658 257/19 |
| 2010/0129623 A1 | 5/2010 | Johansson et al. | |
| 2013/0050694 A1 | 2/2013 | Janssen et al. | |

(Continued)

FOREIGN PATENT DOCUMENTS

| | | |
|---|---|---|
| CN | 105060341 | 11/2015 |
| CN | 105424672 A | 3/2016 |

OTHER PUBLICATIONS

Shan Cong et al., Noble Metal-comparable SERS Enhancement from Semiconducting Metal Oxides by Making Oxygen Vacancies, Jul. 17, 2015, http://www.nature.com/ncomms/2015/150717/ncomms8800/full/ncomms8800.html.

*Primary Examiner* — Neil N Turk
(74) *Attorney, Agent, or Firm* — Tong Rea Bentley & Kim LLC

(57) ABSTRACT

A surface enhanced Raman spectroscopy (SERS) sensor may include a nano structured surface and a nonstoichiometric oxide layer. The nano structured surfers may include a first peak, a second peak and a valley between the first peak and the second peak. The non-stoichiometric oxide layer may include a first portion on the first peak and a second portion on the second peak.

18 Claims, 7 Drawing Sheets

(56) References Cited

U.S. PATENT DOCUMENTS

| | | | |
|---|---|---|---|
| 2014/0009758 A1* | 1/2014 | Li | B05D 3/007 |
| | | | 356/301 |
| 2014/0065806 A1 | 3/2014 | Ahn et al. | |
| 2015/0077743 A1* | 3/2015 | Maznichenko | G01N 21/658 |
| | | | 356/301 |

* cited by examiner

SERS SENSOR

BACKGROUND

Surface enhanced Raman spectroscopy (SERS) technology may utilize nano fingers with metal tips to facilitate the enhanced sensing of interactions resulting from light impinging an analyte associated with the nano fingers. The sensed interactions may be utilized to identify or analyze the analyte.

DETAILED DESCRIPTION OF EXAMPLES

Surface enhanced Raman spectroscopy (SERS) represents a very powerful tool for the identification of salient molecular species. Many SERS sensors utilize a noble metal, such as gold, silver or copper, to enhance or magnify substrate-analyte molecular interactions. However, the use of noble metals may increase the cost and complexity of the SERS sensors as well as limit the range of uses for the SERS sensors.

The present disclosure describes an SERS sensor and method for forming an SERS sensor that utilizes a nonstoichiometric oxide layer, rather than a noble metal, on peaks of a nano structured surface to enhance or magnify substrate-analyte molecular interactions. As a result, the SERS sensor may be fabricated a lower cost using complementary metal-oxide-semiconductor (CMOS) compatible technology and may have a wider range of uses.

Figure 1:
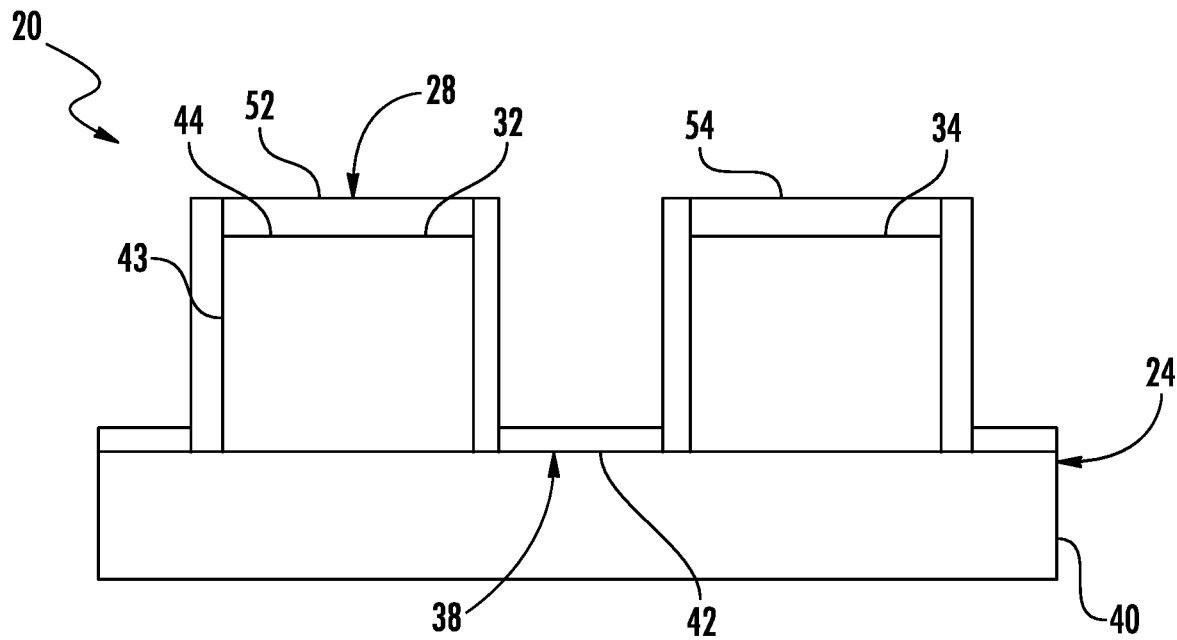
FIG. 1 is a sectional view schematically illustrating a portion of an example SERS sensor.

FIG. 1 is a sectional view of an example SERS sensor 20 that utilizes a nonstoichiometric oxide layer on peaks of a nano structure surface to enhance or magnify substrate-analyte molecular interactions, such as plasmonic resonance. SERS sensor 20 comprises nano structured surface 24 and nonstoichiometric oxide layer 28. Nano structure surface 24 comprises a surface having multiple peaks separated from one another by a valley. In the example illustrated, nano structure surface 24 is illustrated as having a first peak 32 and a second peak 34 spaced by an intervening valley 38 between peaks 32, 34. Peaks 32 and 34 comprise local maxima while valley 38 comprises a local minimum. In the example illustrated, the local maxima and local minima, wherein the local maxima (or peaks) are physically isolated or physically spaced from one another by the local minima. In another implementation, the local maxima may be functionally isolated from one another by local minima comprising intermediate or interposed interference or diminution structures/mechanisms that act like functional valleys.

In one implementation, peaks 32, 34 are formed upon and rise up from a distinct underlying platform or substrate 40 which forms a floor 42 of valley 38. In another implementation, peaks 32, 34 are integrally formed as a single unitary body with and as part of substrate 40. In one implementation, peaks 32, 34 are formed from a polymer or a mixture of polymers. In one implementation, peaks 32, 34 formed from an ultraviolet resistive material, such as an epoxy-based negative photoresist. Examples of materials from which peaks 32, 34 may be formed include, but are not limited to, polypropylene, poly-3-hydroxybutyrate, ply(vinyl acetate), polychlorotrifluoroethylene, polyamide (Nylone-6,x), polylactic acid, polyethylene terephthalate, poly (vinyl chloride), poly(vinyl alcohol), polystyrene, Poly (methyl methacrylate), acrylonitrile butadiene styrene (ABS), polycarbonate, epoxy (SU8), negative photoresist and Polydimethylsiloxane (PMDS), or combinations thereof.

In one implementation, peaks 32, 34 are formed in a controlled manner so as to have a predefined and uniform spacing between peaks 32, 34 and other surrounding peaks. For example, in some implementations, peaks 32, 34 may be molded or nano imprinted on substrate 40. In other implementations, peaks 32, 34 may be formed by material removal techniques, such as etching and/or photolithography. In yet other implementations, peaks 32, 34 may be formed upon substrate by controlled material deposition techniques such as three-dimensional printing or drop-on-demand printing. In some implementations, substrate 40 and peaks 32, 34 are formed as part of a roll-to-roll process. Because peaks 32, 34 may be provided with consistent or uniform peak-to-peak spacings and characteristics across an individual sensor and amongst different sensors 20, more accurate comparisons of the results from different portions of an individual sensor or amongst different sensors themselves may be achieved. In other implementations, the spacing between peaks 32, 34 may be less controlled and more random.

Although peaks 32, 34 are illustrated as having a polygonal or cylindrical cross sectional shape with side walls 42 that extend perpendicular to substrate 40 and a top surface 44 that extends parallel to substrate 40, in other implementations peaks 32, 34 may have other shapes. For example, peaks 32, 34 may alternatively have a rounded or pointed top 44. Sidewalls 42 may alternatively be inclined or sloped. In some implementations, sidewalls 42 may be stepped. Although two peaks 32, 34 are illustrated, it should be understood that sensor 20 may comprise a multitude of peaks 32, 34. In some implementations, such peaks 32, 34 may be arranged in a two dimensional array of individual peaks or multimers (individual groupings) of peaks across substrate 40.

In one implementation, each of peaks 32, 34 have height of at least 500 nm and no greater than 800 nm. In one implementation, each of peaks 32, 34 have an average thickness or diameter (along their height) of at least 50 nm and no greater than 150 nm. In yet other implementations, peaks 32, 34 may have different heights and average thicknesses.

Nonstoichiometric oxide layer 28 comprises a layer of a metal oxide material having a nonstoichiometric deficiency of oxygen. Examples of metal oxide materials forming nonstoichiometric oxide layer 28 include, but are not limited to, $WO_{3-x}$, $CuO_x$, $TiO_x$, $ZnO_x$, where the x number in the oxide represents the ratio of oxygen to the metal element. In some implementations, layer 28 comprises a metallic oxide such as $W_{18}O_{49}$, or $Tl_4O_7$. Other examples of material for nonstoichiometric oxide layer 28 include iron, tungsten, the actinide series, rare earth and transition metals and lanthanide series. In yet other implementations, layer 28 may have other nonstoichiometric oxide compositions.

Layer 28 comprises a first portion 52 on peaks 32 and a second portion 54 on peak 34. Portions 52, 54 provide enhance Raman signal intensity to facilitate enhanced sensitivity. In one implementation, portions 52 and 54 of layer 28 each have a thickness of at least 3 Å and no greater than 10 nm. As indicated by broken lines in FIG. 1, in some implementations, layer 28 may additionally extend alongside walls 43 of peaks 32, 34. In some implementations, layer 28 may additionally extend across floor 42 of valley 38, continuously extending from the base of peak 32 to the base of peak 34.

As will be described hereafter, in some implementations, valley 38 may omit layer 28 such that portions 52 and 54 of layer 28 are spaced apart from one another by valley 38, forming distinct islands of non-stoichiometric material. In such implementations in which portion 52 and 54 are isolated from one another, Raman signal intensity may be further enhanced for improved sensitivity, providing the strongest electric field differential. In particular, "hot spots" may be more pronounced and detectable.

In one implementation, layer 28 is formed upon at least peaks 32, 34 of surface 24 using physical vapor deposition (PVD) or atomic layer deposition (ALD). Such deposition processes provide enhanced control of the oxygen deficiency of the material forming layer 28. For example, the nonstoichiometric oxide $W_{18}O_{49}$, which offers enhanced Raman signal amplification, may be synthesized through the baking of sol gels (WCl6 dissolved in ethanol followed by a hydrothermal reaction at 180° C. for 24 hours). However, this process is not very controllable, resulting in the nonstoichiometric oxide being transformed to a corresponding trioxide form $WO_3$ which offers very weak Raman signal amplification. By way of comparison, $W_{18}O_{49}$ may be synthesized and deposited in a more controlled manner with PVD or ALD with a lower risk of the nonstoichiometric oxide material transforming to a weaker amplifying trioxide form.

Figure 2:
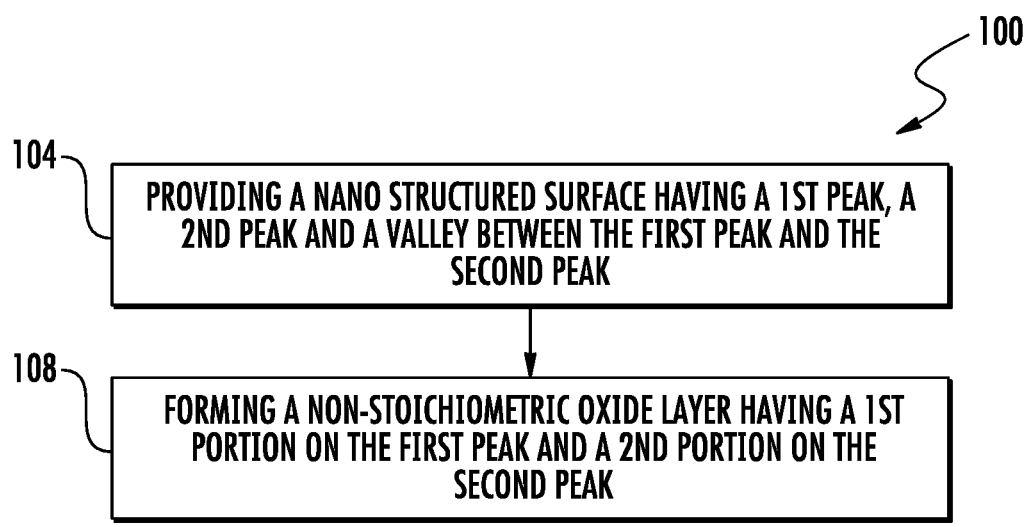
FIG. 2 is a flow diagram of an example method for forming an example SERS sensor.

FIG. 2 is a flow diagram of an example method 100 for forming an example SERS sensor. Although method 100 is described as being carried out to form SERS sensor 20 shown in FIG. 1, it should be understood that method 100 may be carried out to form many of the other SERS sensors described hereafter. As indicated by block 104, a nanostructured surface, such as nanostructure surface 24, is provided. The nanostructured surface has a first peak, a second peak, and a valley between the first peak and the second peak.

As indicated by block 108, a nonstoichiometric oxide layer, such as oxide layer 28, is formed on the nanostructured surface. In the example illustrated, the nonstoichiometric oxide layer is formed with a first portion on the first peak and a second portion on the second peak. The resulting SERS sensor may be fabricated with a lower cost using complementary metal-oxide-semiconductor (CMOS) technology, and may have a wider range of uses.

Figure 3:
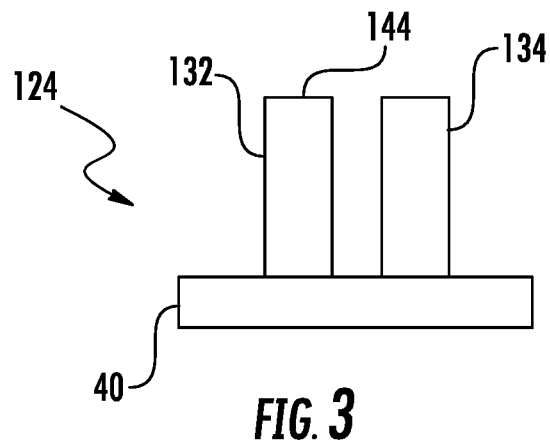
FIG. 3 is a side view of a portion of an example nano structure surface for forming a SERS sensor.
Figure 4:
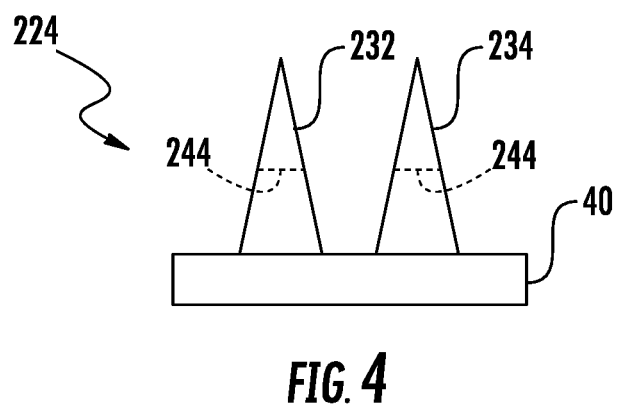
FIG. 4 is a side view of a portion of another example nano structure surface for forming a SERS sensor.
Figure 5:
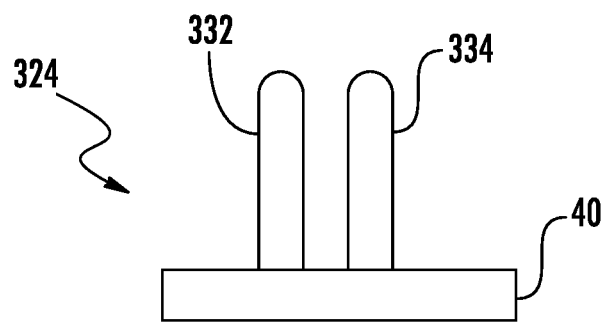
FIG. 5 is a side view of a portion of another example nano structure surface for forming a SERS sensor.

FIGS. 3-5 are sectional views illustrating various examples of different nanostructures surfaces upon which a nonstoichiometric oxide layer may be formed to form a SERS sensor. FIG. 3 illustrates a portion of an example nanostructure surface 124 having a substrate 40 and peaks 132, 134 in the form of pillars. Such pillars comprise vertical nano rods or posts rising up from substrate 40. Each pillar has a substantially flat top surface 144 upon which the nonstoichiometric oxide layers may be coated or otherwise formed. Such pillars may have a circular cross-section, an oval cross-section or a polygonal cross sectional shape, the cross-section being taken in a plane parallel to the upper face of substrate 40 as seen in FIG. 3.

FIG. 4 illustrates a portion of an example nanostructure surface 224. Surface 224 comprises substrate 40 and peaks 232, 234. Peaks 232, 234 comprise pointed structures, such as cones or multi-sided pyramids that rise from substrate 40. In yet other implementations, as illustrated by broken lines, the pointed tips of such pointed structures forming peaks 232, 234 may be shaved, removed or not provided, wherein peaks 232, 234 are truncated to alternatively comprise frustro-conical or frusto-pyramidal structures having flat or inclined top surfaces 244 that may be coated or otherwise covered with a nonstoichiometric oxide layer.

FIG. 5 illustrates a portion of an example nanostructure surface 324. Surface 324 comprises substrate 40 and peaks 332, 334. Peaks 332, 334 comprise pillars rising up from substrate 40 and having rounded tops. The rounded tops provide surfaces upon which the nonstoichiometric oxide layer may be deposited or otherwise formed. Although peaks 332, 334 are illustrated as having a uniform diameter, thickness or cross sectional shape, such pillars 332, 334 may have non-uniform thicknesses or diameters along their height. Although each of peaks 132, 134, 232, 234, 322, 334 are illustrated as having the same height and the same thickness, in other implementations, such pairs of peaks may have heights that differ from one another or diameters/thicknesses that differ from one another.

Figure 6:
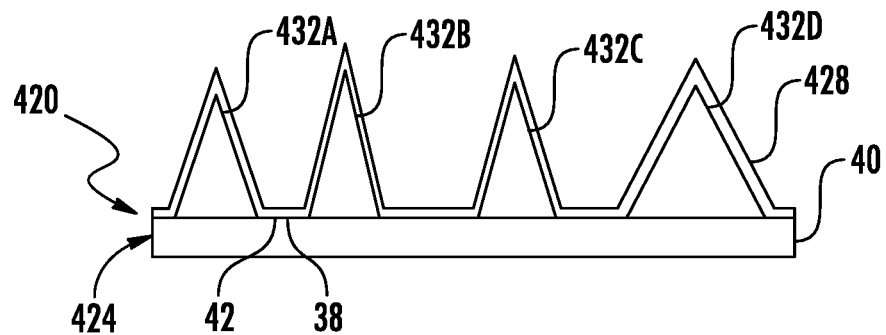
FIG. 6 is a sectional view of a portion of another example SERS sensor.

FIG. 6 is a sectional view of SERS sensor 420 example implementation of SERS sensor 20. SERS sensor 420 comprises nanostructure surface 424 and nonstoichiometric oxide layer 428. Nanostructure surface 424 is similar to nanostructure surface 224 described above. Nanostructure surface 424 comprises substrate 40 and peaks 432A, 432B, 432C, 432D (collectively referred to as peaks 432). Peaks 432 are similar to peaks 232, 234 described above. Peaks 432 are separated by intervening valleys 438. In the example illustrated, peaks 432 have differing heights, thicknesses and profiles. Each of peaks 432 rises up from substrate 40, and has a pointed tip. In the example illustrated, peaks 432 are arranged in a two dimensional array (into the page). Although each of peaks 432 is illustrated as having a centerline perpendicular to substrate 40, in other implementations, peaks 432 may alternatively have centerlines that obliquely extend from substrate 40, such that peaks 432 are angled or tilted.

Nonstoichiometric oxide layer 428 is similar to nonstoichiometric oxide layer 28 described above in that layer 428 extends over at least the top or upper portions of each of peaks 432. Nonstoichiometric oxide layer 428 comprises a layer of a metal oxide material having a nonstoichiometric deficiency of oxygen. Examples of metal oxide materials forming nonstoichiometric oxide layer 428 include, but are not limited to, $WO_{3-x}$, $CuO_x$, $TiO_x$, where the x number in the oxide represents the ratio of oxygen to the metal element. In some implementations, layer 428 comprises a metallic oxide such as $W_{18}O_{49}$ or $Tl_4O_7$. In yet other implementations, layer 428 may have other nonstoichiometric oxide compositions.

In the example illustrated, layer 428 extends across floor 442 of valley 438, continuously extending from the base of one of peaks 432 to the base of the other of peaks 432. Those portions of layer 428 covering the top portions of peaks 432 provide enhance Raman signal intensity to facilitate enhanced sensitivity. In one implementation, layer 428 has a thickness of at least 3 Å and no greater than 10 nm.

In one implementation, layer 428 is formed upon at least peaks 432 of surface 424 using physical vapor deposition (PVD) or atomic layer deposition (ALD). Such deposition processes provide enhanced control of the oxygen deficiency of the material forming layer 428. For example, $W_{18}O_{49}$ may be synthesized and deposited in a more controlled manner with PVD or ALD with a lower risk of the nonstoichiometric oxide material transforming to a weaker amplifying trioxide form.

Figure 7:
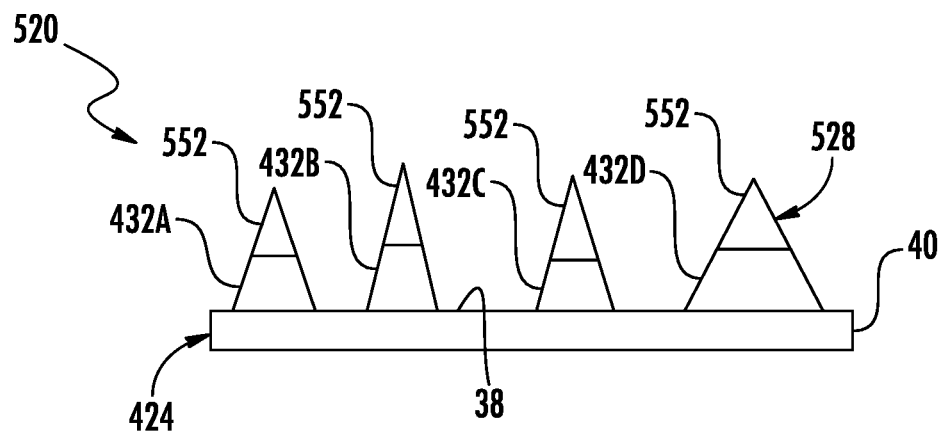
FIG. 7 is a side view of a portion of another example SERS sensor.
Figure 8:
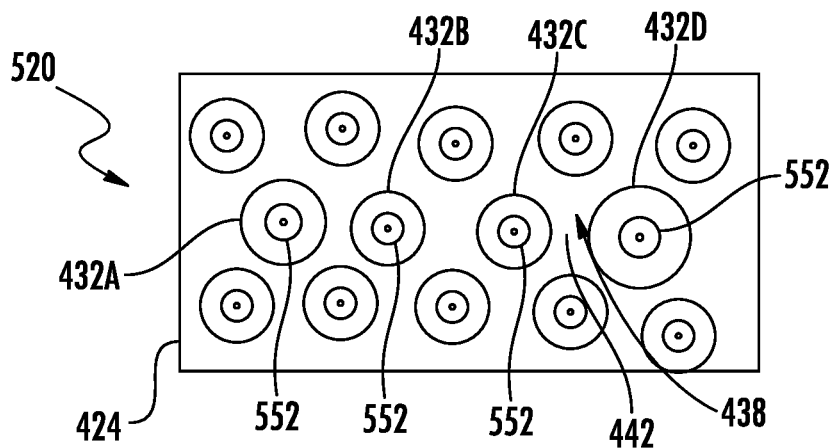
FIG. 8 is a top view of the example SERS sensor of FIG. 7.

FIGS. 7 and 8 illustrate SERS sensor 520. FIG. 7 is a side view of a portion sensor 520 while FIG. 8 is a top view of the portion sensor 520. SERS sensor 520 is similar to SERS sensor 420 described above except that SERS sensor 520 comprises nonstoichiometric oxide layer 528 in place of layer 428. Those remaining components of sensor 520 which correspond to components of sensor 420 are numbered similarly.

Layer 528 is similar to layer 428, except that layer 528 has portions 552 that cover or coat only upper portions of peaks 432. The valleys 438 between peaks 432 and floor 442 of substrate 40 omit layer 428 such that each of portions 552 of layer 528 are spaced apart from one another by valley 38, forming distinct islands of non-stoichiometric material. Because portions 552 of layer 528 are isolated from one another, facially and/or functionally, Raman signal intensity may be further enhanced for improved sensitivity. In particular, "hot spots" may be more pronounced and detectable.

Figure 9:
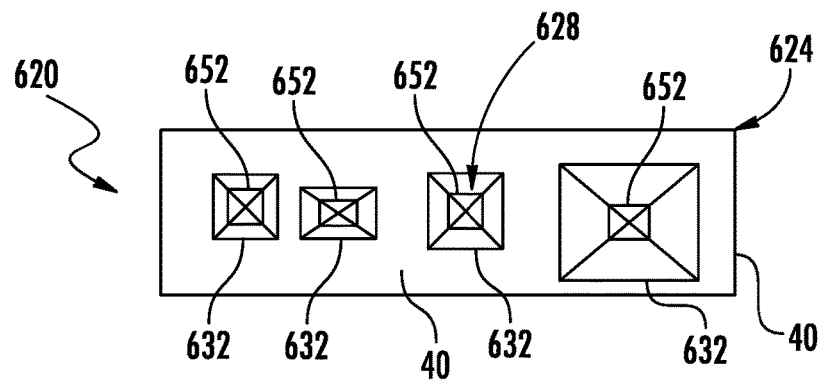
FIG. 9 is a top view of a portion of another example SERS sensor.

In the example illustrated in FIG. 8, each of peaks 432 has a conical shape, a shape that tapers from a circular base to a point. In such an implementation, portions 552 of layer 528 also have a corresponding conical shape. As shown by FIG. 9, similar SERS sensors may have other shaped peaks and corresponding other shapes for the nonstoichiometric oxide layer.

FIG. 9 illustrates a portion of SERS sensor 620. Sensor 620 is similar to sensor 520 described above except that sensor 620 comprises a surface 624 and nonstoichiometric oxide layer 628. Those remaining components of sensor 620 that correspond to components or elements of sensor 520 are numbered similarly.

Surface 624 is similar to surface 424 except that surface 624 comprises peaks 632 in place of peaks 432, wherein each of peaks 432 has a polygonal base with sloping sides that converge to a point at the top. In the example illustrated, each of such peaks 432 has a pyramid shape. In the example illustrated, peaks 432 have different sizes, such as different lengths, widths and heights relative to one another. In other implementations, peaks 632 may have a substantially flat upper surface for underlying and supporting layer 628. For example, in some implementations, each of peaks 432 may comprise a truncated pyramid or a frustum pyramid.

Nonstoichiometric oxide layer 628 is similar to layer 528 described above. Layer 628 coats or covers an upper portion of each of peaks 632. As a result, layer 628 conforms to the shape of peaks 632, also having a polygonal base with sloping sides that converge to a point at the top. As with layer 528, layer 628 terminates prior to reaching floor 432 provided by substrate 40. Layer 628 does not extend across the valleys between adjacent peaks 632. As a result, Raman signal intensity may be further enhanced for improved sensitivity. In particular, "hot spots" may be more pronounced and detectable. In the example illustrated, the different portions 652 of layer 628 on the different peaks 632 cover different extents of their respective peaks 632. In some implementations, the different portions 652 each start at a same single height above floor 40. In some implementations, the different portions 652 have differing thicknesses on the different peaks 632.

Figure 10:
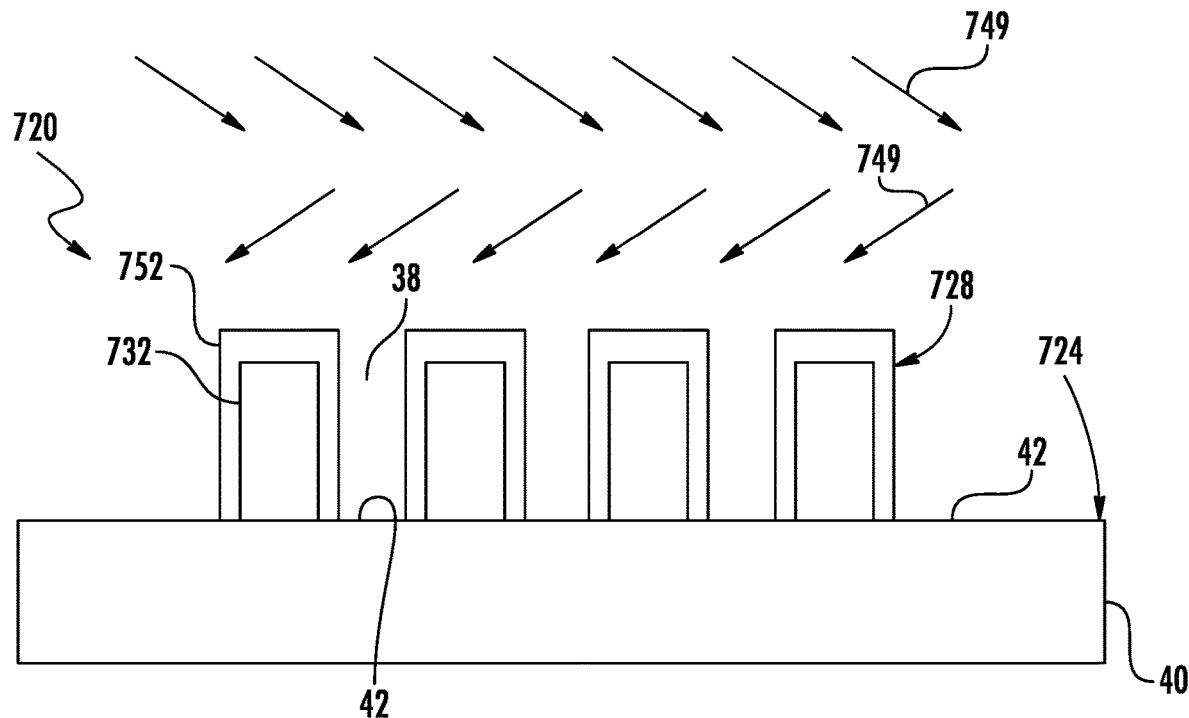
FIG. 10 is a sectional view of another example SERS sensor.

FIG. 10 is a sectional view of an example SERS sensor 720. Sensor 720 comprises nanostructures surface 724 and nonstoichiometric oxide layer 728. Surface 724 comprises a surface having multiple peaks 732, in the form of pillars (cylindrical or polygonal), separated from one another by intervening valleys 38 provided by the floor 40. In the example illustrated, nano structure surface 724 comprise a two dimensional array of peaks 732, wherein the pillars of peaks 732 are uniformly spaced from one another. In other implementations, such peaks 732 may be non-uniformly spaced from one another along floor 42 of substrate 40. Although each of such peaks 732 is illustrated as having the same width and length/diameter and the same height, in other implementations, such peaks 732 may have different weights, different lengths, different diameters and as such are different heights respect to one another. It should be understood that neither surface 724 nor layer 728 in FIG. 10 or the other figures are necessarily proportional. In the example illustrated, the intervening valleys comprise physical voids or spaces lacking the material of layer 728. In other implementations, the intervening valleys may comprise functional valleys, intervening materials that act like valleys due to their material properties, distinct from the materials of layer 728.

In one implementation, peaks 732 are formed upon and rise up from a distinct underlying platform or substrate 40 which forms a floor 42 of valley 38. In another implementation, peaks 732 are integrally formed as a single unitary body with and as part of substrate 40. In one implementation, peaks 732 are formed from a polymer or a mixture of polymers. In one implementation, peaks 732 are formed from an ultraviolet resistive material, such as an epoxy-based negative photoresist. Examples of materials from which peaks 732 may be formed include, but are not limited to, polypropylene, poly-3-hydroxybutyrate, ply(vinyl acetate), polychlorotrifluoroethylene, polyamide (Nylone-6, x), polylactic acid, polyethylene terephthalate, poly(vinyl chloride), poly(vinyl alcohol), polystyrene, Poly(methyl methacrylate), acrylonitrile butadiene styrene (ABS), polycarbonate, epoxy (SU8), negative photoresist and Polydimethylsiloxane (PMDS), or combinations thereof.

In one implementation, peaks 732 are formed in a controlled manner so as to have a predefined and uniform spacing between peaks 732 and other surrounding peaks. For example, in some implementations, peaks 732 may be molded or nano imprinted on substrate 40. In other implementations, peaks 732 may be formed by material removal techniques, such as etching and/or photolithography. In yet other implementations, peaks 732 may be formed upon substrate by controlled material deposition techniques such as three-dimensional printing or drop-on-demand printing. In some implementations, substrate 40 and peaks 732 are formed as part of a roll-to-roll process. Because peaks 732 may be provided with consistent or uniform peak-to-peak spacings and characteristics across an individual sensor and amongst different sensors 270, more accurate comparisons of the results from different portions of an individual sensor or amongst different sensors themselves may be achieved. In other implementations, the spacing between peaks 732 may be less controlled and more random.

In one implementation, each of peaks 732 have a height of at least 500 nm and no greater than 800 nm. In one implementation, each of peaks 732 has an average thickness or diameter (along their height) of at least 50 nm and no greater than 150 nm. In yet other implementations, peaks 732 may have different heights and average thicknesses.

Nonstoichiometric oxide layer 728 comprises a layer of a metal oxide material having a nonstoichiometric deficiency of oxygen. Examples of metal oxide materials forming nonstoichiometric oxide layer 728 include, but are not limited to, $WO_{3-x}$, $CuO_x$, $TiO_x$, where the x number in the oxide represents the ratio of oxygen to the metal element. In some implementations, layer 728 comprises a metallic oxide such as $W_{18}O_{49}$ or $Tl_4O_7$. In yet other implementations, layer 28 may have other nonstoichiometric oxide compositions. In one implementation, layer 728 has a thickness of at least 3 Å and no greater than 10 nm.

Layer 728 comprises portions 752 that are isolated from one another by intervening valleys 38 and intervening portions of floor 42 of substrate 40, wherein portions 752 do not extend across such valleys 38 and intervening portions of floor 42 from one peak 732 to another peak 732. Because portions 752 of layer 728 form distinct islands of nonstoichiometric material that are isolated from one another, Raman signal intensity may be enhanced for improved sensitivity. In particular, "hot spots" may be more pronounced and detectable.

In one implementation, layer 728 is formed upon at least peaks 732 of surface 724 using physical vapor deposition (PVD) or atomic layer deposition (ALD). Such deposition processes provide enhanced control of the oxygen deficiency of the material forming layer 728. FIG. 10 illustrates one example method by which layer 728 may be formed upon peaks 732 so as to isolate the different portions 752 from one another. In the example illustrated, layer 728 is formed by directionally applied physical vapor deposition. As indicated by arrows 749, the nonstoichiometric oxide material which forms layer 728 is applied in directions non-perpendicular to floor 42 of substrate 40 such that the nonstoichiometric oxide material is not deposited upon floor 42 of substrate 40 between peaks 732. Rather, the nonstoichiometric oxide material coats just the sides and top of each of the pillars forming peaks 732. Although portion 752 of layer 728 are illustrated as having a substantially uniform thickness along the sides and top of each of the pillars forming peaks 732, in some implementations, coding may not be uniform on each of the pillars. For example, depending upon the angle of application and the spacing in height of the pillars forming peaks 732, the thickness of the coating or film of nonstoichiometric oxide material may vary along the height of each of the sidewalls of the pillars.

In yet other implementations, the isolation of the different portions 752 of layer 728 from one another may be provided in other fashions. For example, masking, photolithography or other location selective deposition or location selective application methods may be employed to inhibit the deposition of the nonstoichiometric oxide material upon floor 42 and/or upon the side surfaces of the pillars forming peaks 732. In yet other implementations, nonstoichiometric oxide material that has become deposited upon floor 42 or upon side walls of the pillars so as to interconnect the different portions 752 of layer 728 on the different peaks 732 may be removed through etching, ablation or the like to subsequently isolate such portions 752 from one another.

Figure 11:
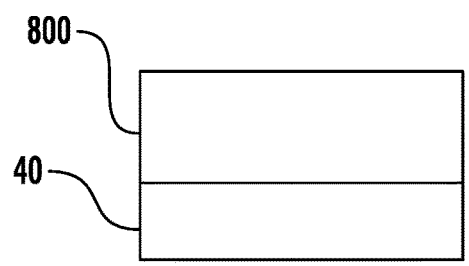
FIGS. 11-14 are sectional views illustrating stages of one example method for forming an example SERS sensor.

FIGS. 11-14 schematically illustrates an example method for forming an example SERS sensor, such as SERS sensor 720. As shown by FIG. 11, substrate 40, supporting an imprintable layer of material 800 is provided. In one implementation, material 800 comprises a layer of ultraviolet resist or other photoresist materials. In one implementation, material 800 comprises a photoresist epoxy, such as a Bisphenol A Novolac epoxy dissolved in an organic solvent (sometimes referred to as SU-8). The layer of material 800 may be provided on substrate 40 by spin coating, sputtering or other deposition techniques.

Figure 12:
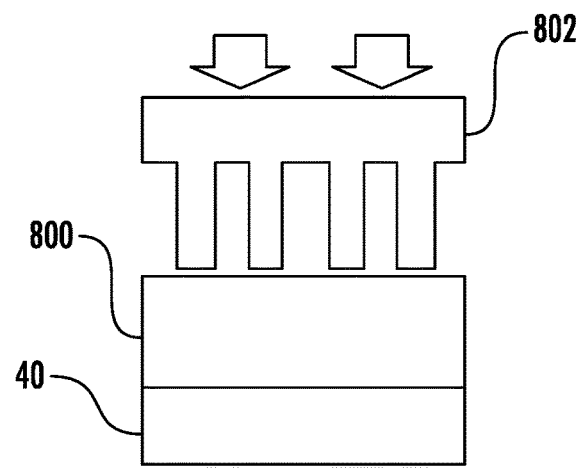
Figure 13:
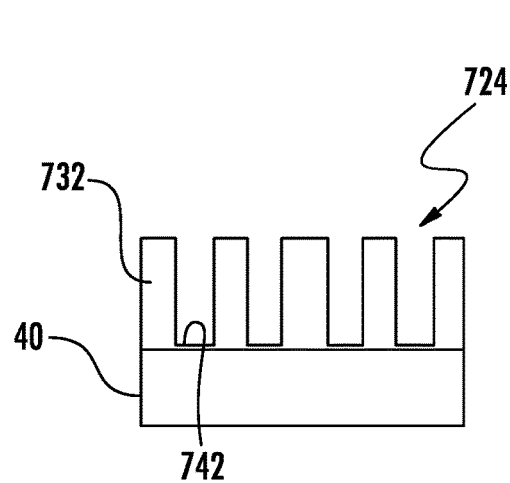

As illustrated by FIGS. 12 and 13, layer of material 800 is imprinted with a master 802 and cured with ultraviolet light to produce the nano surface 724 shown in FIG. 13. In the example illustrated, material 800 forms the floor 742 between each of peaks 732. In other implementations, material 800 between peaks 732 may be completely removed such as substrate 40 forms of floor between each of peaks 732.

Figure 14:
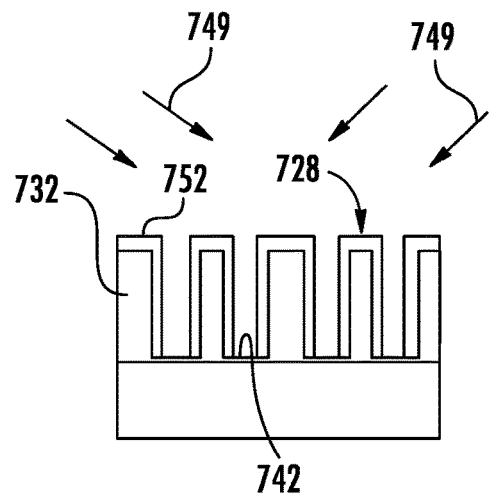

As illustrated by FIG. 14, a nonstoichiometric oxide layer 728 is applied over into the peaks 732 of nanostructures surface 724. In the example illustrated, layer 728 is applied so as to not extend continuously from one peak 732 to another peak 732, but instead have isolated portions 752 which form islands of nonstoichiometric oxide material. As indicated by arrows 749, in one implementation, the nonstoichiometric oxide material is deposited control directional deposition, nonparallel to floor 742, such as through physical vapor deposition, such that portion 752 of layer 728 on the different peaks 732 are isolated from one another. As noted above, in other implementations, layer 728 may be selectively deposited and/or selectively removed using other techniques such that portions 752 of layer 728 are isolated from one another, peak-to-peak.

Figure 15:
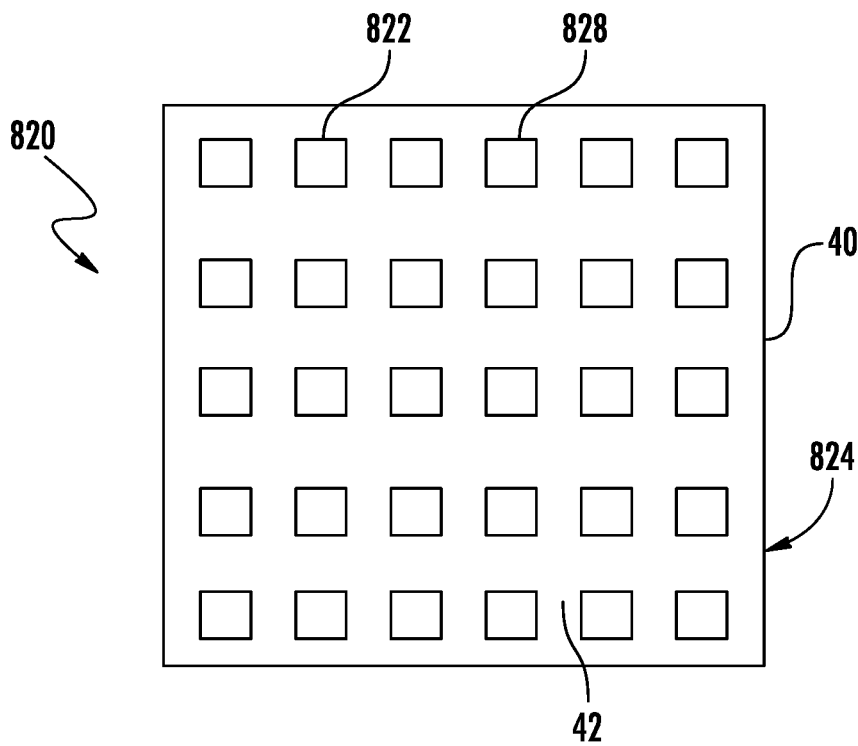
FIG. 15 is a top view of another example SERS sensor, illustrating a layout of sensing columns.
Figure 16:
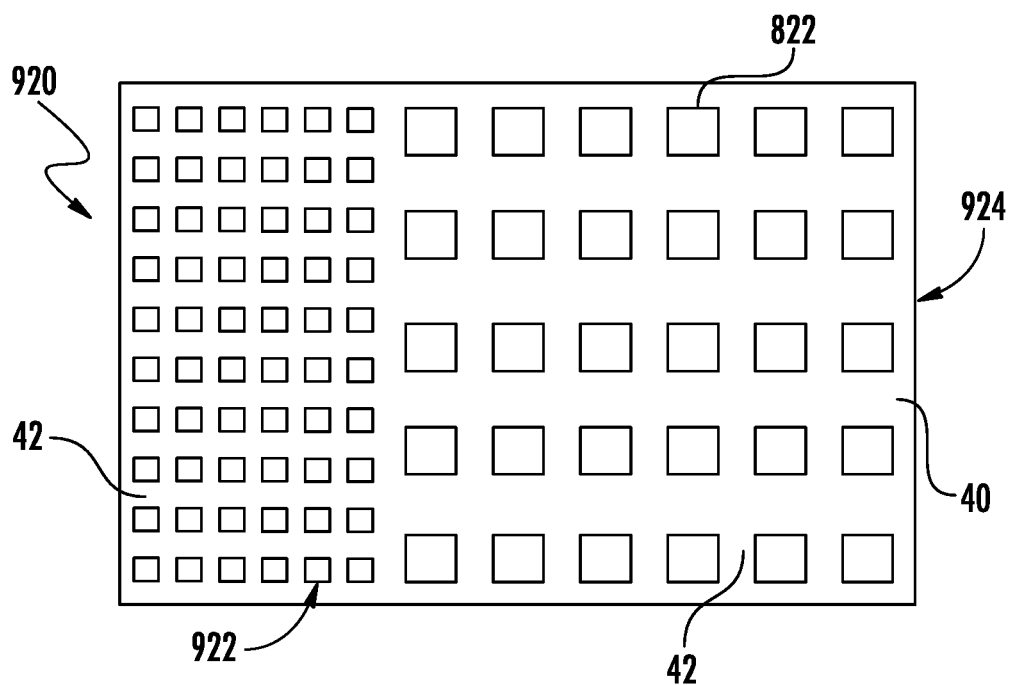
FIG. 16 is a top view of another example SERS sensor, illustrating another layout of sensing columns.
Figure 17:
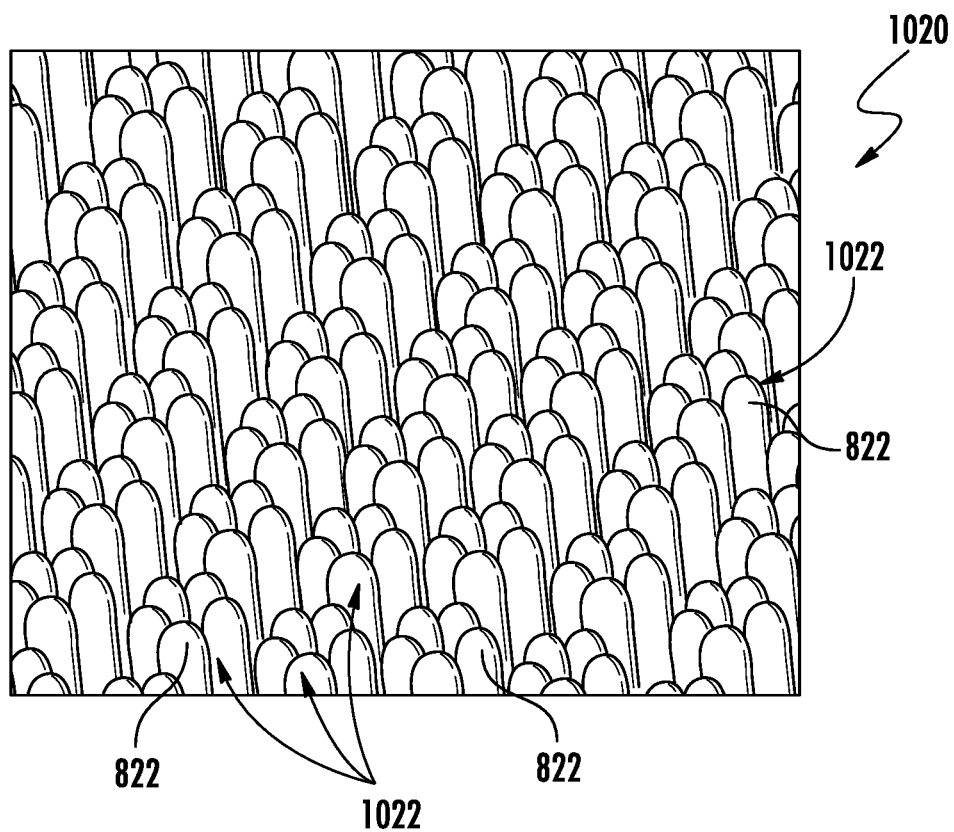
FIG. 17 is a top perspective view of another example SERS sensor, illustrating another layout of sensing columns.

FIGS. 15-17 illustrate various example SERS sensors, each of the SERS sensors having different two-dimensional patterns or arrangements of columns, peaks coded with a nonstoichiometric oxide layer. FIG. 15 is a top view of an example SERS sensor 820. Sensor 820 comprises nano structure surface 824 and nonstoichiometric oxide layer 828. Nanostructure surface 824 comprises substrate 40 and a two dimensional grid or array of pillars rising up from substrate 40. Each of the pillars is coated with an isolated portion of layer 828 so as to form a nonstoichiometric oxide layer coated column 822. In other words, each column 822 comprises a peak of surface 824 and the portion of the non-stoichiometric oxide layer 828 that coats the individual peak.

Nonstoichiometric oxide layer 828 comprises a layer of a metal oxide material having a nonstoichiometric deficiency of oxygen. Examples of metal oxide materials forming nonstoichiometric oxide layer 828 include, but are not limited to, $WO_{3-x}$, $CuO_x$, $TiO_x$, where the x number in the oxide represents the ratio of oxygen to the metal element. In some implementations, layer 828 comprises a metallic oxide such as $W_{18}O_{49}$ or $Tl_4O_7$. In yet other implementations, layer 828 may have other nonstoichiometric oxide compositions. In one implementation, layer 828 has a thickness of at least 3 Å and no greater than 10 nm.

As shown by FIG. 15, the columns 822 are arranged in a two dimensional array of equally spaced uniformly distributed columns 822. In the example illustrated, each of columns 822 is relatively rigid or unbendable (not closable relative to one another or towards one another). In other implementations, each column 822 may be bendable or flexible, having a greater height and/or form from a more flexible material, so as to close relative to one another or towards one another, such as in response to evaporation of the solvent containing an analyte.

FIG. 16 is a top view of another example SERS sensor, sensor 920. Sensor 920 is similar to sensor 820, except that sensor 920 comprises distinct sensing regions, each of the distinct sensing regions having distinct columns and/or arrangement of columns. In the example illustrated, sensor 920 comprises columns 822 (described above) having a first spacing and a first density along substrate 40 and columns 922 having a second closer spacing and a second closer density as compared to columns 822. Like columns 822, columns 922 comprise pillars that rise up from substrate 40 to form nanostructure surface 924, wherein each of the pillars are coated with different isolated portions of nonstoichiometric oxide layer 828. In one implementation, columns 922 are not closable, do not bend or flex. In another implementation, columns 922, like columns 822, are bendable or flexible to facilitate closing, such as during evaporation of the solvent containing the analyte. Because nano structure surface 924 comprises different densities or patterns of peaks or pillars to provide different densities or patterns of columns 822, 922, SERS sensor 920 provides a diversity of testing conditions, facilitating detection of a single analyte under different conditions or detection of different analytes, wherein the different patterns or densities of columns 822, in a run 22 are customized for different analytes.

FIG. 17 is a top perspective view of another example SERS sensor, sensor 1020. SERS sensor 1020 is similar to SERS sensor 820 except that sensor 1020 comprises a two dimensional grid or array of multimers 1022, each multimer 1022 comprising a closely arranged group or set of columns 822. In the example illustrated, columns 822 of multimers 1022 are resiliently flexible or bendable so as to be closable. For example, upon evaporation of the solvent containing analyte, the individual columns 822 of each multimer 1022 bend or flex towards one another to facilitate the capture and retention of analyte molecules therebetween. Although multimers 1022 are illustrated as comprising a pentagonal arrangement of five individual columns 822, in other implementations, each of multimers 1022 may comprise other sets or groupings of different numbers of columns 822. In yet other implementations, the columns 822 may be inflexible or not closable.

Each of sensors 820, 920 and 1020 may be formed in various fashions. In one implementation come each of sensors 820, 920 and 1020 is formed according to a method similar to that shown in FIGS. 11-14, wherein the nanostructures surface is formed by imprinting and wherein the nonstoichiometric oxide layer is directionally deposited onto the formed peaks or pillars to form isolated islands of nonstoichiometric oxide material on such peaks or pillars. Although columns 822, 922 are illustrated as coated pillars, in other implementations, each of columns 822, 922 may alternatively comprise other coated peaks rising up from substrate 40, such as peaks 232 and 332 in FIGS. 4 and 5, respectively. In yet other implementations, the nonstoichiometric oxide layer may continuously extend from peak to peak rather than having isolated portions on the individual peaks.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A surface enhanced Raman spectroscopy (SERS) sensor comprising:
    a nano structured surface having a first peak, a second peak and a valley between the first peak and the second peak, wherein the first peak and the second peak comprise a polymer; and
    a nonstoichiometric oxide layer having a first portion on the first peak and a second portion on the second peak, wherein the nonstoichiometric oxide layer comprises one of $W_{18}O_{49}$ and $Ti_4O_7$.

2. The SERS sensor of claim 1, wherein the nonstoichiometric oxide layer continuously extends from the first peak, across the valley, to the second peak.

3. The SERS sensor of claim 1, wherein valley omits the nonstoichiometric oxide layer such that the first portion and the second portion of the nonstoichiometric layer are spaced from one another by the valley.

4. The SERS sensor of claim 3, wherein the nano structured surface comprises a first pillar forming the first peak and a second pillar forming the second peak.

5. The SERS sensor of claim 4, wherein the first pillar and the second pillar are part of a pattern of pillars, each of the pillars of the pattern having a controlled predetermined spacing with respect to other pillars of the pattern.

6. The SERS sensor of claim 1, wherein the first portion and the second portion of the nonstoichiometric oxide layer on the first peak and the second peak, respectively, are uncovered.

7. The SERS sensor of claim 1, wherein the nonstoichiometric oxide layer comprises a material selected from a group of materials consisting of iron, tungsten, the actinide series, rare earth and transition metals and the lanthanide series.

8. A method for forming a surface enhanced Raman spectroscopy sensor (SERS) sensor, the method comprising:
    providing a nano structured surface having a first peak, a second peak and a valley between the first peak and the second peak, wherein the first peak and the second peak are formed from a polymer; and
    forming a nonstoichiometric oxide layer having a first portion on the first peak and a second portion on the second peak, wherein the nonstoichiometric oxide layer comprises one of $W_{18}O_{49}$ and $Ti_4O_7$.

9. The method of claim 8, wherein providing the nano structured surface comprises forming a first pillar having the first peak and a second pillar having the second peak.

10. The method of claim 9, wherein forming the nonstoichiometric oxide layer comprises coating the first peak and the second peak with the nonstoichiometric oxide layer with a process selected from a group of processes consisting of physical vapor deposition and atomic layer deposition.

11. The method of claim 10, wherein the first peak and the second peak are controllably coated with the nonstoichiometric oxide layer such that the first portion and the second portion are distinct islands of nonstoichiometric oxide material separated from one another.

12. The method of claim 10 further comprising removing portions of the nonstoichiometric oxide layer such that the first portion and the second portion are distinct islands of nonstoichiometric oxide material separated from one another.

13. The method of claim 8, wherein forming the first pillar and the second pillar comprises forming a pattern of pillars including the first pillar and the second pillar, wherein each of the pillars of the pattern of pillars has a predetermined spacing with respect to other pillars of the pattern of pillars.

14. The SERS sensor of claim 1, wherein the first peak has a first pointed tip and when the second peak has a second pointed tip.

15. The SERS sensor of claim 1, wherein the first peak comprises a first pyramid and when the second peak comprises a second pyramid.

16. The SERS sensor of claim 1, wherein the first peak and the second peak are each conical.

17. The SERS sensor of claim 1, wherein the first peak has a first base with a first width and wherein the second peak has a second base with a second width different than the first width.

18. The SERS sensor of claim 1, wherein the first peak and the second peak are formed from a polymer.

* * * * *